March 7, 1944. F. O. CLEMENTS ET AL Re. 22,452
METHOD OF MAKING POWDERED IRON
Original Filed May 5, 1938
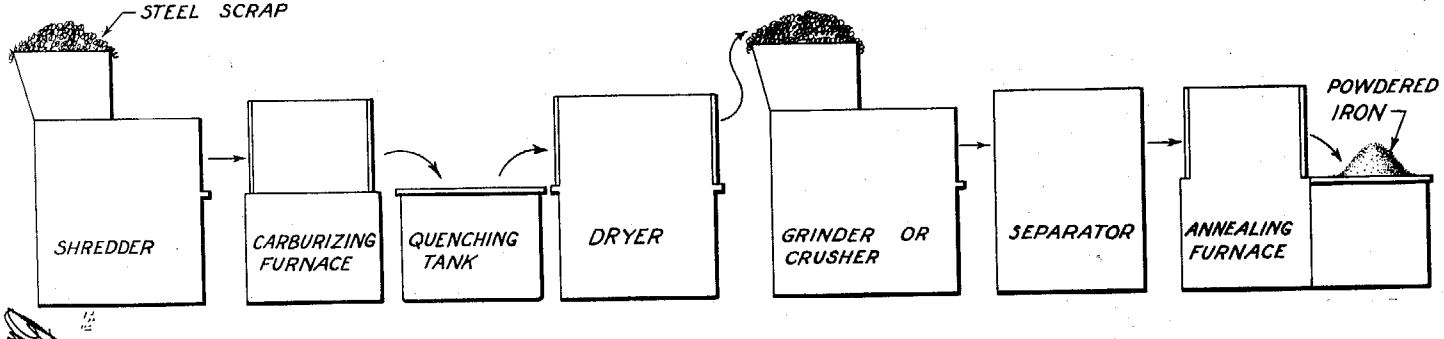
Inventors
Frank O. Clements,
Robert K. Tetty &
Donald J. Kenty
Blackmar, Spencer & Flint
Attorney Reissued Mar. 7, 1944

Re. 22,452

UNITED STATES PATENT OFFICE 22,452

METHOD OF MAKING POWDERED IRON

Frank O. Clements, Westerville, Ohio, and Robert H. Terry and Donald J. Henry, Detroit, Mich., assignors to General Motors Corporation, Detroit, Mich., a corporation of Delaware Original No. 2,164,198, dated June 27, 1939, Serial No. 206,234, May 5, 1938. Application for reissue June 14, 1940, Serial No. 340,622

21 Claims. (Cl. 75—22)

This invention has to do with a method of making iron powder. The method is economical and is capable of being controlled so that the powder produced by it may have any degree of hardness, carbon content or fineness desired.

The method consists in carburizing iron or steel throughout and then quenching it from above the critical temperature to render it brittle. The iron or steel is preferably reduced to small pieces prior to carburization to promote the carburizing action. While the metal so treated is very hard it is so brittle and friable that it may be readily crushed or ground to a powder.

The resulting powder is satisfactory for many uses but where it is desired to form articles out of the material by pressing, it is preferred to give the material further treatment to increase the cohesiveness of the particles. This may be done by annealing it in a suitable oven having a non-oxidizing or reducing atmosphere to soften it without decreasing the carbon content or it can be annealed in moist hydrogen to decrease the carbon content to the extent desired and at the same time reduce any oxides formed during quenching. The softened particles are readily deformed and hold together when dry pressed.

The process may be carried out by means of many kinds of apparatus. The drawing is a flow diagram showing schematically an arrangement of apparatus especially suitable for the production of powdered iron from steel scrap.

The raw material may be any kind of iron or steel which is capable of being carburized. It is cheapest to use scrap and the most suitable kind of scrap consists of the chips and turnings resulting from machining operations. Variations in analysis of the iron or steel found in such scrap are of little consequence for most uses of the powder.

It will usually be necessary to continue carburization until the carbon penetrates all the way through the metal and so that this may not take too long it will be found desirable to use nothing but thin chips or turnings and if the scrap contains pieces of greater thickness these may be readily separated from the rest by employing some sort of gravity or centrifugal separation or by passing the scrap through suitable disintegrating or shredding apparatus indicated on the drawing which reduces the metal to the desired size.

Next the metal is passed through a carburizing furnace, preferably of the muffle type, in which it is subjected to the action of a carburizing gas or carburizing compound. Natural gas or any suitable commercial gas may be used. The carburizing treatment should continue until carbon penetrates through the chips and turnings and is present in sufficient quantity to make the metal very brittle after quenching.

The carburized metal is now suddenly cooled in any suitable manner to harden it and make it brittle. This may be conveniently done by quenching in oil or water and we have indicated on the drawing a quenching tank through which the carburized material is passed. The resulting product will be found to be very hard and friable.

Next the material is passed through a drier in which the moisture is carried off, and then through a suitable crushing mill or grinder as indicated in which the brittle carburized material is reduced to a fine powder. The pulverized material may then be passed through a suitable separator, and thus sorted according to size and, if desired, some or all of it may be subjected to further treatment as by running it through another crushing mill or by grinding in a ball mill or the like to increase its fineness.

The resulting product will be found to be very hard and difficult to shape by dry pressing because the particles cannot be deformed by the use of ordinary pressures and so will not cohere. To overcome this difficulty the material is now annealed by passing it through a suitable annealing furnace in which the material is protected by a neutral or reducing atmosphere. A hydrogen atmosphere has proven very satisfactory. The reducing atmosphere removes any oxides that may be present and, depending upon its composition, also reduces the carbon content to the amount desired. The annealing operation leaves the material soft so that it may be readily deformed and dry pressing may be successfully used to make articles from the powder.

The character and time of treatment will, of course, vary somewhat with the material treated and the purposes for which it is to be used, and no difficulty will be experienced in making such minor adjustments. As a specific example of the application of the invention, we have successfully made satisfactory iron powder of a high degree of purity from machine shop chips and turnings not exceeding about .035'' in thickness using the following specific treatment. Carburizing was carried out in a rotary, muffle type of carburizing furnace. Natural gas was used for carburizing. Carburizing was continued for from 1 to 3 hours at a temperature of around 1700° F. The scrap turnings analyzed about .20 to .40% carbon, although it would have been equally usable with greater or less amounts of carbon. The time of treatment was determined by the time required for the carbon to penetrate through the thickest pieces, preferably until the carbon content was about .8% or more at the center of each piece.

The material was cooled by quenching in water to make it hard and brittle. It was then ground in a ball mill to the desired degree of fineness.

The crushed material was annealed for half an hour to an hour at 1500° to 1700° F. in an atmosphere of hydrogen. Annealing is preferably done in a revolving pot to insure that all of the pulverized material receives the same treatment.

The resulting material consists of a mixture of angularly shaped particles that cohere very well when pressed together. It contains very little foreign matter.

An advantage of this method of making iron powder is the fact that any desired degree of hardness or carbon content may be obtained by controlling the steps of the process. The product is exceptionally free of oxides and foreign matter. The cost of the raw material is very low and the whole operation may be carried on automatically if desired, the raw material being fed in at one end and the sorted powders taken out at the other using conventional conveyors to carry the material through the equipment in the order indicated on the drawing.

For brevity the word "iron" is used in the following claims to cover all forms of iron and steel, whether plain or alloyed, that can be carburized.

We claim:

1. The method of making powdered iron which consists in carburizing iron, rapidly cooling it to make it brittle, breaking it up into particles of the desired size, and annealing the particles to make them relatively soft and briquettable.

2. The method of making powdered iron which consists in carburizing iron, rapidly cooling it to make it brittle, breaking it up into particles of the desired size, and annealing the particles in a reducing atmosphere to make them relatively soft and briquettable while maintaining them free from oxidation.

3. The method of making powdered iron which consists in preparing iron in the form of pieces of small thickness, carburizing the pieces all the way through, rapidly cooling them to make them brittle, and breaking them up into particles of the desired size and annealing the particles to make them relatively soft and briquettable.

4. A method of making iron powder, comprising the steps of, increasing the carbon content of iron while the iron is hot, rapidly cooling the iron so as to make the iron brittle, comminuting the high carbon iron to the desired size, and then annealing the comminuted iron particles under decarburizing conditions for reducing the carbon content thereof and for softening the particles.

5. A method of making iron powder, comprising the steps of, increasing the carbon content of iron while the iron is hot, rapidly cooling the iron so as to make the iron brittle, breaking up said brittle iron into very fine particles of predetermined size by ball-milling the iron, and then decarburizing the iron particles under suitable conditions for reducing the carbon content thereof and for softening the particles.

6. Steel powders comprising steel particles having iron substantially throughout and having a substantial proportion of carbon combined with the iron and concentrated in the cores of the particles, said particles having exterior ferritic zones substantially free from carbon.

7. In a process for making briquetted articles, the improvement which comprises subjecting steel powder particles containing combined carbon substantially throughout to the action of a hot decarburizing atmosphere until outer portions of substantially carbon free iron have been formed on said particles, and compressing the said particles to form an article of desired shape in which the particles readily cohere.

8. In a process for making briquetted articles, the improvement which comprises comminuting hard brittle steel containing combined carbon substantially throughout to form powder particles of the desired size, annealing said powder particles to make them relatively soft and briquettable, and thereafter compressing said powder particles to form a coherent mass.

9. In a process of making articles from powdered iron, the improvement which comprises comminuting hard brittle steel containing combined carbon substantially throughout to form powder particles of a desired size, annealing said powder particles under decarburizing conditions for reducing the carbon content thereof and for softening the powder particles, and thereafter compressing said annealed powder particles to form a coherent mass.

10. A process for making steel powders which comprises subjecting hot iron powder particles to the action of a carburizing gas until carbon has been deposited on the interior of the particles in the form of a substance selected from the group consisting of pearlite and cementite, and thereafter subjecting said powder to the action of a gaseous decarburizing agent until the outer portions of the particles are substantially decarburized but combined carbon remains in the interior of the particles.

11. In a process for making briquetted articles, the improvement which comprises subjecting steel powder particles containing combined carbon substantially throughout to the action of a hot decarburizing atmosphere until exterior ferritic zones substantially free from carbon have been formed on said powder particles and combined carbon remains in the cores of said powder particles, and pressing said decarburized powder particles into article form.

12. In a process for making articles by pressing metal powder into the form desired, the improvement which comprises subjecting hot iron to the action of a carburizing medium to increase the carbon content thereof, partially decarburizing the outer portions of iron powder particles of the iron having the increased carbon content, and pressing said partially decarburized powder particles into article form.

13. A process for making metal powder which comprises subjecting hot iron particles to the action of a carburizing gas until carbon has been deposited on the interior of the iron particles in the form of a substance selected from the group consisting of pearlite and cementite, and thereafter subjecting powder particles of the carburized iron to the action of a gaseous decarburizing agent until the outer portions of the powder particles are substantially decarburized but combined carbon remains in the interior of the powder particles.

14. In a process for making briquetted articles, the improvement which comprises subjecting steel powder particles containing combined carbon substantially throughout to the action of a hot decarburizing atmosphere until a shell of substantially carbon-free iron has been formed on the outside of said particles, and compressing the resulting powder particles to form a coherent mass.

15. In a process for making steel objects, the improvement which comprises subjecting steel powder particles containing combined carbon substantially throughout to the action of a hot decarburizing atmosphere until a shell of substantially carbon-free iron has been formed on the outside of said particles, and compressing the resulting powders to form a coherent mass.

16. In a process for making steel objects, the improvement which comprises subjecting steel powder particles containing combined carbon substantially throughout to the action of a hot decarburizing atmosphere until shells of substantially carbon-free iron have been formed on the outside of said particles but leaving cores containing iron carbide on the inside of the particles, and thereafter compressing the powders into a coherent mass.

17. In a process for making steel objects the improvement which comprises subjecting steel powder particles having interior portions containing combined carbon and exterior zones of substantilly carbon-free iron to compression to form a coherent mass.

18. In a process for making steel objects the improvement which comprises subjecting to compression to form a coherent mass steel powder particles having interior portions containing combined carbon and exterior portions of substantially carbon-free iron.

19. In a process for making steel objects the improvement which comprises compressing to form a coherent mass, steel powder particles that have been partially decarburized so as to have cores containing combined carbon and exterior portions substantially free of carbon.

20. The method of making iron powder comprising the steps of, carburizing hot iron to a carbon content of at least .8%, rapidly cooling the carburized iron so as to make the iron brittle, comminuting the carburized iron to particles of the desired size, and then annealing the comminuted iron for making the particles thereof relatively soft and briquettable.

21. The method of making iron powder, comprising the steps of, increasing the carbon content of hot iron to at least .8%, quenching the carburized iron to make the same brittle, comminuting the carburized iron to particles of the desired size and then decarburizing and simultaneously annealing the comminuted iron at a temperature between 1500° F. and 1700° F. for a period in the neighborhood of one-half hour for reducing the carbon content thereof to the carbon content desired and for softening the particles.

FRANK O. CLEMENTS.
ROBERT H. TERRY.
DONALD J. HENRY.